(12) United States Patent
McBrearty et al.

(10) Patent No.: US 7,096,333 B2
(45) Date of Patent: Aug. 22, 2006

(54) LIMITED CONCURRENT HOST ACCESS IN A LOGICAL VOLUME MANAGEMENT DATA STORAGE ENVIRONMENT

(75) Inventors: Gerald Francis McBrearty, Austin, TX (US); Thomas Van Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 10/199,384

(22) Filed: Jul. 18, 2002

(65) Prior Publication Data

US 2004/0015668 A1 Jan. 22, 2004

(51) Int. Cl.
*G06F 12/00* (2006.01)
(52) U.S. Cl. .................. 711/163; 711/152; 711/161; 711/162; 711/168; 711/170; 709/225; 709/229
(58) Field of Classification Search ................ 711/152, 711/161, 162, 163, 168, 170; 709/229, 225
See application file for complete search history.

(56) References Cited

U.S. PATENT DOCUMENTS

| | | | | |
|---|---|---|---|---|
| 6,523,027 B1* | 2/2003 | Underwood | ................ | 707/4 |
| 6,636,984 B1* | 10/2003 | McBrearty et al. | ............ | 714/6 |
| 2002/0156756 A1* | 10/2002 | Stanley et al. | ................ | 706/47 |
| 2003/0182246 A1* | 9/2003 | Johnson et al. | ................ | 705/76 |
| 2003/0212752 A1* | 11/2003 | Thunquest et al. | ......... | 709/213 |
| 2003/0221124 A1* | 11/2003 | Curran et al. | ................ | 713/201 |
| 2003/0236850 A1* | 12/2003 | Kodama | .................... | 709/214 |
| 2004/0167984 A1* | 8/2004 | Herrmann | ................... | 709/229 |
| 2004/0236916 A1* | 11/2004 | Berkowitz et al. | .......... | 711/162 |

OTHER PUBLICATIONS

Instruction on using UNIX CHMOD, "www.soest.hawaii.edu/chmod.html" pp. 1-2, Oct. 18, 2001.*

* cited by examiner

*Primary Examiner*—Reginald G. Bragdon
*Assistant Examiner*—Mehdi Namazi
(74) *Attorney, Agent, or Firm*—Casimer K. Salys; Dillon & Yudell LLP

(57) ABSTRACT

A method, system, and program product for controlling multi-node access to a disk storage system. In accordance with the method of the present invention, an active access authorization is set for a first node. The active access authorization enables read and write access by the first node to user and meta data within the disk storage system. A passive access authorization is set for a second node. The passive access authorization enables read-only access by the second node to logical volume management meta data within the disk storage system.

36 Claims, 6 Drawing Sheets

LIMITED CONCURRENT HOST ACCESS IN A LOGICAL VOLUME MANAGEMENT DATA STORAGE ENVIRONMENT

BACKGROUND OF THE INVENTION

1. Technical Field

The present invention relates in general to data storage systems, and in particular to serialized management of shared data storage resources. More particularly, the present invention relates to a limited concurrent access reservation technique that facilitates efficient switching of host access to resources within a data storage volume group.

2. Description of the Related Art

Logical volume management is a common approach to virtualizing disk storage. The set of operating system commands, library subroutines, and other tools that allow a user to establish and control logical volume storage is called the Logical Volume Manager (LVM). Instead of handling data storage management using physical disk partitions, an LVM divides disk space into logical partitions. LVMs offer advantages in facilitating mass data storage accessibility and management including greater flexibility for disk partitioning, on-the-fly resizing of logical volumes, and disk mirroring spanning multiple drives for greater data backup reliability.

A common LVM application is depicted in FIG. 1, which illustrates a high-level representation of LVM functionality within a data storage subsystem 100. The logical layer (i.e. LVM layer) 104 of data storage subsystem 100 controls and coordinates disk resources by mapping data between a simple and flexible logical view of storage space within a designated volume group 108 and the actual physical disks within disk drives 124 and 126. LVM layer 104 does this by using a layer of device driver code, depicted in FIG. 1 as logical volume device driver (LVDD) 110, that runs above traditional physical device drivers, represented in FIG. 1 as host bus adapter 120. The logical view of the storage resources, represented as logical volumes 112a and 112b, is provided to higher-level applications 114 and 116 within an application layer 102, and is independent of the underlying physical disk structure within physical layer 106.

Disk drives 124 and 126 are each designated within LVM layer 104 as a physical volume. In the depicted example, disk drives 124 and 126, are physically represented in LVM layer 104 as physical volumes 118 and 119, respectively. Strictly speaking, a volume group is a designated collection of physical volumes each divided in physical partitions. A logical volume is a collection of one or more logical partitions, each of which can be mapped to any physical partition in the volume group. If mirroring is used, a mirrored logical partition is mapped to two or more physical partitions.

In LVM data storage subsystems, such as data storage subsystem 100, volume groups operate in either a concurrent access mode in which the object volume group is concurrently accessible from more than one host system simultaneously, or in a non-concurrent access mode. In a non-concurrent access mode, hardware reservations are utilized to ensure that volume groups can be accessed online by only one host system.

The hardware reservations in a non-concurrent access volume group pose problems in situations in which it is necessary to switch access control to the volume group from its currently approved host system to another host system. The circumstances under which volume group control switching generally occurs fall under one of two general categories. First, a so-called "failover" situation occurs when an unforseen failure condition in the host system necessitates switching of access control to data resources within the volume group to another host system. Second, the need to switch control of the volume group to another host system may arise in the natural course of data storage system administration. Normally, such administrative switching is accomplished using a "controlled" switchover.

The first step in a controlled switchover is to terminate the current host's processing on the volume group resource by closing the currently running application (a Web server application, for example), deactivating the volume group, including unmounting the resident file system, and releasing the disk reserves. Next, control access is switched to another host node (typically a standby node) by reading volume group meta data to activate the volume group, mounting the file system, and restarting the application on the new host.

When a forced failover is required and the failed node is inaccessible, it is necessary to "break" the physical disk reservations to permit access to the object volume group from an alternate host system. The need to break the disk reservations contributes significantly to the time required to activate the volume group within the hardware/software operating environment of the new host system for an unexpected failover.

By definition, concurrent access volume groups do not share the aforementioned problems associated with breaking and resetting disk reservations or activating the volume group. However, conventional concurrent access volume groups do not provide the same assurance of serial access to logical volumes within a given volume group. Unlike non-current access volume groups in which I/O commands to the resident logical volumes can only be received by the designated (i.e. reserved) host system, concurrent access volume groups only have a limited lock mechanism that advises applications of the current access status for any given volume group.

From the foregoing, it can be appreciated that a need exists for an LVM mechanism enhanced to facilitate switch over of volume groups between host systems, while preserving the advantages of conventional non-concurrent access mechanisms. The present invention addresses such a need.

SUMMARY OF THE INVENTION

A method, system, and program product for controlling multi-node access to a disk storage system are disclosed herein. In accordance with the method of the present invention, an active access authorization is set for a first node. The active access authorization enables read and write access by the first node to user and meta data within the disk storage system. A passive access authorization is set for a second node. The passive access authorization enables read-only access by the second node to logical volume management meta data within the disk storage system.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

As explained in further detail with reference to the figures, the present invention is directed to serializing access to a multi-disk data storage resource, referred to herein as a "volume group". Furthermore the present invention provides a fast failover mechanism by which a standby node can assume control of the data storage resources within a volume group without the need to reactivate the volume group. Preferred embodiments are illustrated and described herein in the context of a Logical Volume Management (LVM) data storage architecture such as that utilized by the Advanced Interactive eXecutive (AIX) operating system. It should be noted, however, that the inventive principles disclosed herein are more widely applicable to any multi-disk architectures in which concurrent and non-concurrent access management issues arise as required to maintain adequate data consistency and security.

Figure 1:
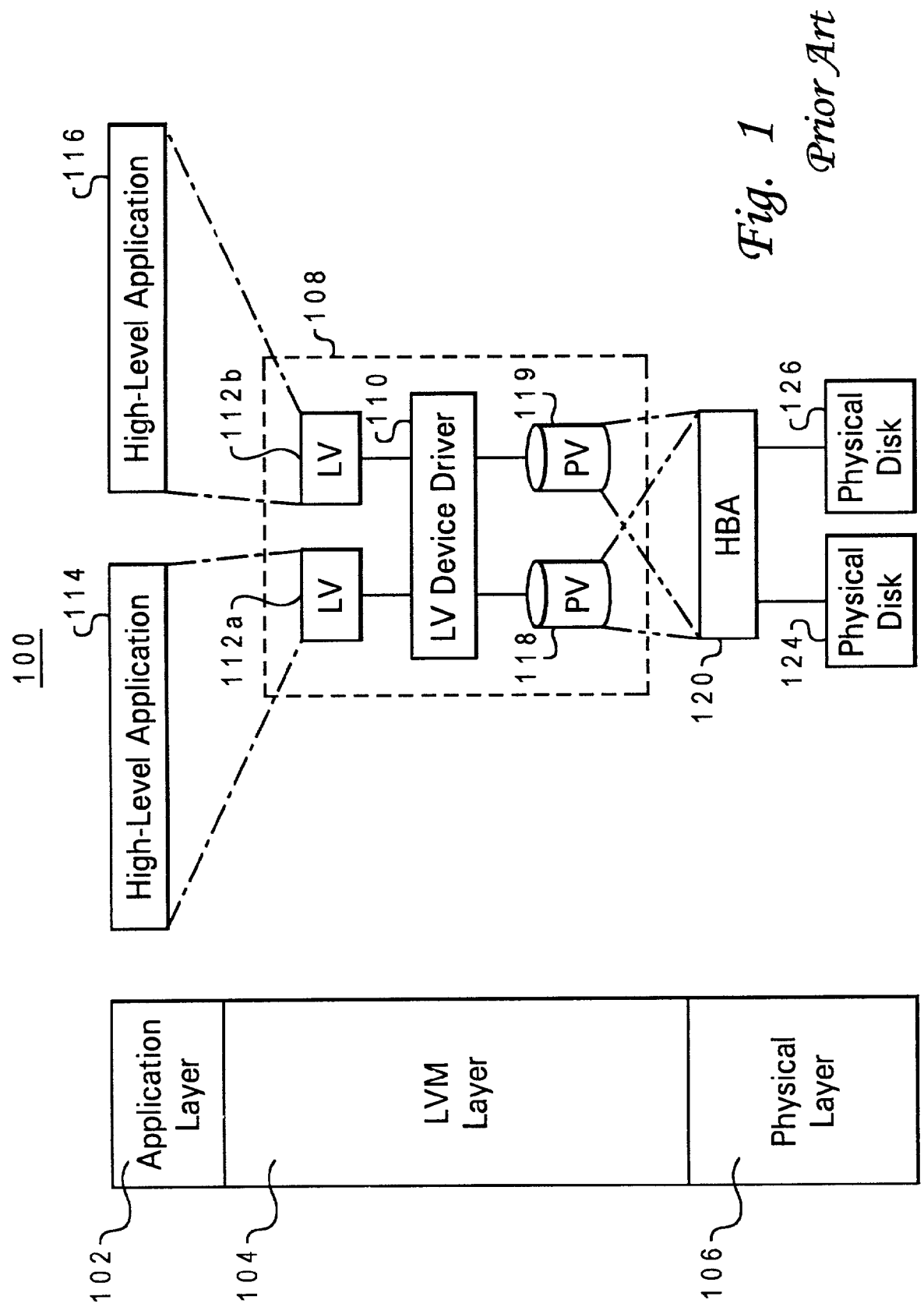
FIG. 1 illustrates a conventional logical volume management data storage system.
Figure 2:
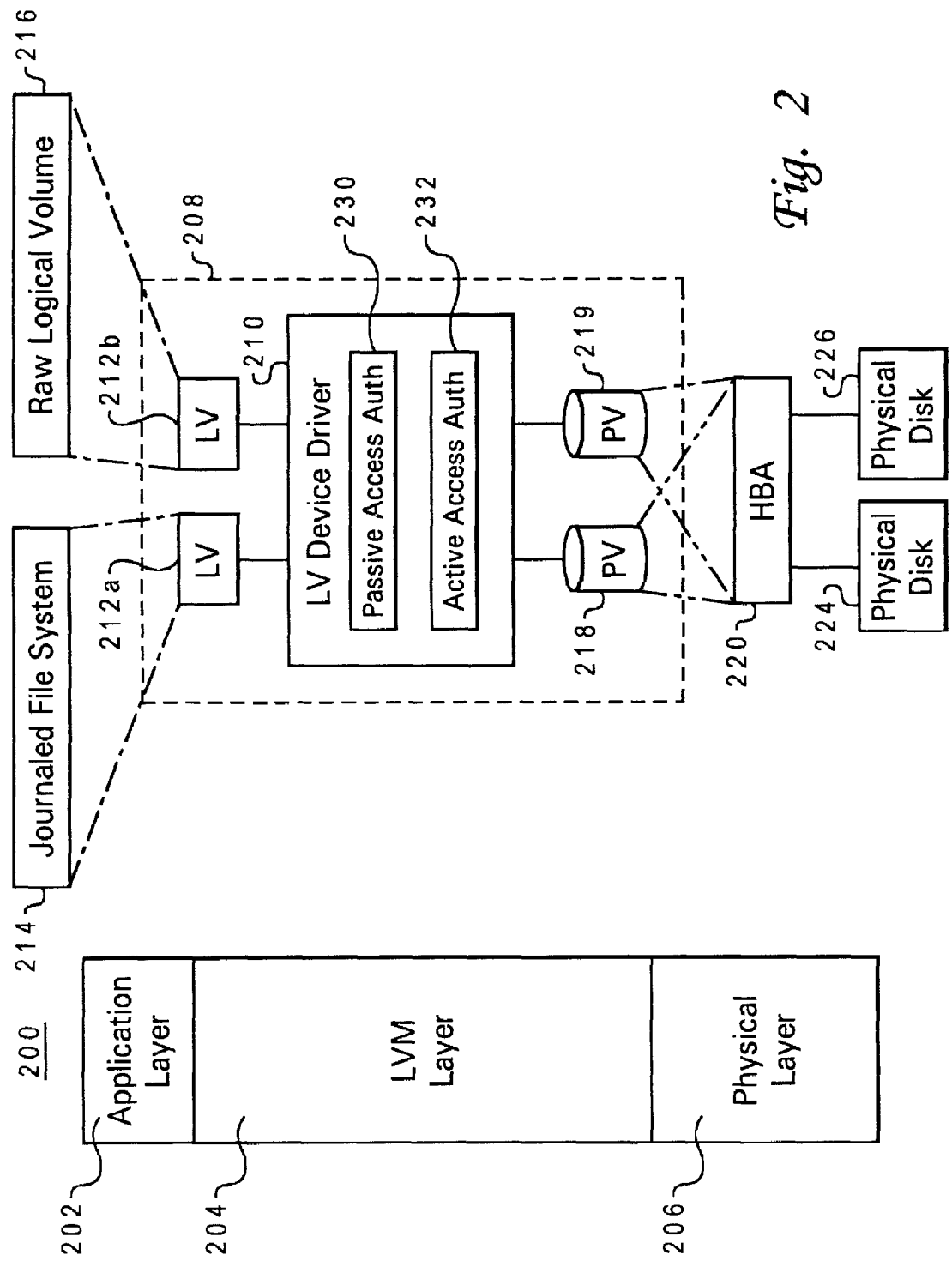
FIG. 2 illustrates a logical volume management data storage system that employs limited concurrent volume group access in accordance with a preferred embodiment of the present invention.

With reference now to the figures, and in particular with reference to FIG. 2, there is illustrated a logical volume management data storage subsystem 200 that implements limited concurrent volume group access in accordance with a preferred embodiment of the present invention. As utilized herein, a "volume group" is a collection of one or more physical resources (e.g. disk drives) that are partitioned into a set of logical volumes, while a "partition" refers to an arbitrary sized contiguous group of logical or physical blocks. As per conventional volume group terminology, a "logical volume" is a portion of a physical volume or volumes that is processed by the host node as a single logical unit. Logical volumes consist of logical partitions, each of which are mapped into one or more physical partitions of the physical volumes. If mirroring is used, a mirrored logical partition is mapped to two or more physical partitions. In summary, logical volumes present a simple contiguous view of data storage to an application/user while hiding the more complex and possibly non-contiguous physical orientation of the data.

The logical layer (i.e. LVM layer) 204 of data storage subsystem 200 controls and coordinates disk resources by mapping data between a simple and flexible logical view of storage space within a designated volume group 208 and the physical disk media within disk drives 224 and 226. LVM layer 204 does this by using a layer of device driver code, depicted in FIG. 2 as logical volume device driver (LVDD) 210, that runs above traditional physical device drivers that provide the operating system interface with disk drives 224 and 226 via a host bus adapter 220. Disk drives 224 and 226 are each designated within LVM layer 204 as a physical volume. In the depicted embodiment, disk drives 224 and 226, are physically represented in LVM layer 204 as physical volumes 218 and 219, respectively.

As explained in further detail with reference to FIGS. 3, 4, and 5, the present invention employs processing and program functionality within LVM layer 204 that coordinates access from one or more host system nodes (depicted in FIG. 3) to volume group 208. Specifically, the LVM is utilized to establish and enforce a limited concurrent access mode of operation whereby a node (e.g. host server system) having requisite physical and logical connectivity to the data storage resources within volume group 208 is authorized as having either an active access authorization or a limited passive access authorization to the data storage resources within volume group 208. As utilized herein, an active access authorization enables the object node to have full user and meta data access to the volume group. The passive access authorization enables the object node to have read-only access to logical volume meta data while disabling the object node from read or write access to the file system user and meta data.

In one embodiment of the present invention, a single host node is designated as active at a given time, while one or more of the remaining eligible node(s) (e.g. standby server) may be authorized by the LVM layer functionality described herein to have passive access to the object volume group. In accordance with the inventive principles set forth herein, a "passive" access authorization enables read-only access to LVM meta data and all other data access is prevented.

The presently described LVM layer functionality enables/disables active and passive host access by the use of limited concurrent access settings within LVDD 210. In the depicted embodiment, the limited concurrent access settings are applied within an active access authorization field 230 and a passive access authorization field 232 within LVDD 210. LVDD 210 utilizes active access authorization field 230 as an identifier for the host node (depicted in FIG. 3) that is authorized to have full access to file system data and meta data. Passive access authorization field 232 is utilized by LVDD to identify one or more host nodes that have a more limited accessibility to LVM data. Specifically, and as explained in further detail with reference to FIG. 3, a node having a passive access authorization within passive access authorization field 232 will have read-only access to logical volume meta data and will be blocked from read or write access to file system data.

Figure 3:
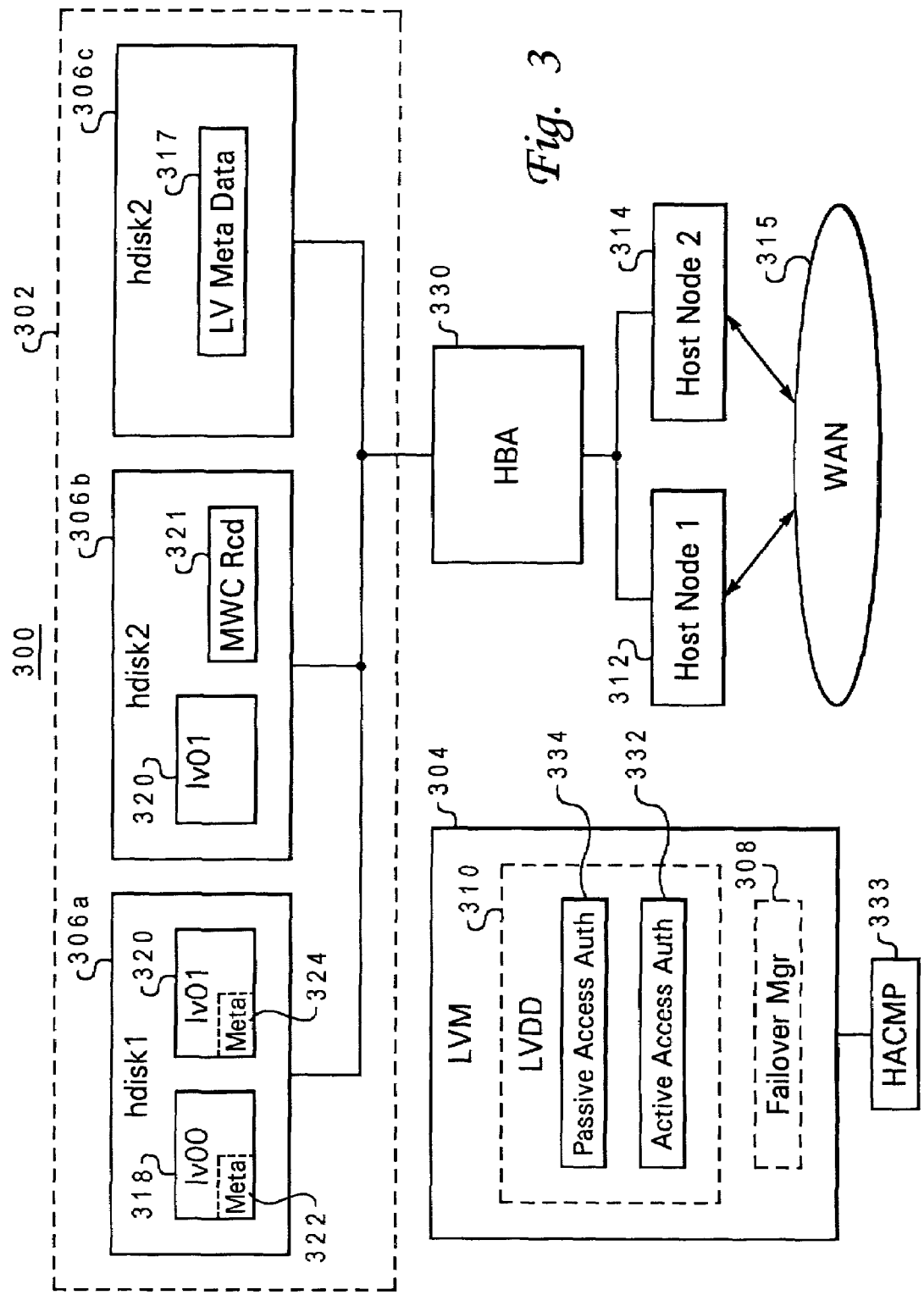
FIG. 3 depicts a networked data storage system employing limited concurrent volume group access in accordance with a preferred embodiment of the present invention.

Referring to FIG. 3, there is depicted a networked data storage system 300 employing limited concurrent volume group access in accordance with a preferred embodiment of the present invention. As illustrated in FIG. 3, networked data storage system 300 includes data storage resources within a volume group 302, and management devices including a primary host server node 312 and a standby host server node 314. Server nodes 312 and 314 provide a server interface between clients (not depicted) within a Wide Area Network (WAN) 315 and the data storage resources within volume group 302. In accordance with conventional client-server architectures, clients deliver I/O requests across WAN 315 to hosts acting as server nodes 312 and 314 to access data storage resources within volume group 302. These I/O requests are processed and forwarded by whichever server node currently has access control of volume group 302.

In the depicted embodiment, an LVM 304, as implemented by a suitable operating system application, such as the Advanced Interactive executive (AIX), provides the requisite mapping between various physical storage resources within volume group 302 including a pair of physical volumes 306a and 306b and logical volumes 318 and 320. LVM 304 is typically deployed from a system administrator node (not depicted) and consists of an LVDD 310 and a subroutine interface library. LVDD 310 is a pseudo device driver analogous to LVDD 210 that manages and processes all I/O transactions for volume group 302, in part, by translating logical addresses into physical addresses and sending I/O requests to specified device drivers that directly communicate with a host bus adapter 330.

In accordance with AIX/LVM convention, logical volumes 318 and 320 can be used in one of two general ways. First, either of the logical volumes may be utilized by the host server node in an unstructured manner (called "raw logical volumes") for a number of purposes such as paging and dump spaces. Second, either or both of the depicted logical volumes may be utilized in a structured manner in which the object logical volume stores ordinary files (data or programs).

In the depicted embodiment, logical volumes 318 and 320 are utilized in a structured manner in which the object logical volume stores ordinary files (data or programs). For "structured" logical volumes 318 and 320, the resident operating system (not depicted) supplies a file system, which is a hierarchical structure of files and directories contained within logical volumes 318 and 320. The file system employed within data storage system 300 includes an on-disk layout, or "physical file system", and a corresponding logical file system (not depicted) implemented as part of the resident operating system. As a sub-application of the resident operating system, the logical file system provides transaction management of the physical file system layout within physical volumes 306a–c.

The on-disk layout is embodied by various data structures within physical volumes 306a–c. In the depicted embodiment, these file system layout data structures are included in so-called "aggregate spaces" (not depicted) within logical volumes 318 and 320. Such aggregate spaces typically include "fileset spaces" which comprise a set of files and directories. In this context, "directories" map user-specified names to corresponding files and form the traditional file naming hierarchy. Within a file system, a "file" contains user data that is processed by the logical file system as an uninterpreted byte stream. The aggregate spaces further includes file system control structures or meta data for logical volumes 318 and 320. Meta data includes, but is not limited to information including the mounting status (i.e. mounted or unmounted) of the file system.

In accordance with known volume group access management techniques, each of logical volumes 318 and 320 includes meta data 322 and 324. Meta data 322 and 324 include file system structure and organization information including the creation date of the logical volume, information about mirrored copies, and file/directory file system mount points. As further illustrated in FIG. 3, volume group 302 includes a physical volume 306c in which logical volume meta data 317 is stored.

A planned or failure-induced host node switchover cycle in which control access to volume group 302 is, for example, switched from host server node 312 to server node 314 includes a source of delay related to disk reservations. Specifically, disk reservations must be released prior to the meta data being accessible to the new host node. For conventional SCSI reserves, logical units (LUNs) within the volume group are individually reserved under a given SCSI address. All of such LUN reservations, often numbering in the hundreds per SCSI address, must be released before the new host may access the volume group meta data.

As implemented in accordance with the present invention, limited concurrent access eliminates the need to maintain and subsequently break disk reservations. As explained in further detail with reference to FIGS. 4 and 5, limited concurrent access employs an active access authorization 332 and a passive access authorization 334. Active access authorization 332 permits read and write access from the host to the file system meta data 322 and 324 as well as file system user data within logical volumes 318 and 320. Passive access authorization 334 permits read-only access from the host to logical volume meta data 317. In addition to preventing write access from the host to logical volume meta data 317, passive access authorization 334 also prevents the host from having read or write access to the file system meta and user data within logical volumes 318 and 320.

Within networked data storage system 300, such active and passive access authorization is implemented in accordance with the settings of an active access authorization field 332 and a passive access authorization field 334 within LVDD 310. The settings of active access authorization field 332 and passive access authorization field 334 are determined and modified by LVM 304 upon system initialization and subsequent switchover/failover operations.

Conventional AIX/LVM volume management permits either concurrent or non-concurrent access from host nodes, such as server nodes 312 and 314, to a given volume group. In conventional concurrent access mode, the object volume group is concurrently accessible from more than one host system (i.e. both server nodes 312 and 314) simultaneously. If volume group 302 has been designated by LVM 304 as operating in a non-concurrent access mode, volume group 302 can be processed online from only one host system (i.e. either server node 312 or 314). The singular accessibility to data resources within volume group 302 is effectuated by a physical volume reservation field (not depicted) within a host bus adapter 330 as set by LVM 304. The setting of the reservation field causes host bus adapter 330 to block access requests from any but the designated host node from being processed. In concurrent access mode, the disk drives are not designated as reserved and are thus not blocked from input/output (I/O) commands from adapters that share the same external I/O busses (typically SCSI or Fibre Channel busses).

The present invention replaces the disk reservation technique as implemented within the host bus adapter with the active and passive access authorization settings as set by the logical volume manager. Specifically, each of the available host nodes is assigned either an active or a passive access authorization within the LVDD which is then able to limit access to file system data in accordance with the assigned authorization of the requestor.

During on-line operations, host server access to I/O data (i.e. file system user data) and file system meta data resources within volume group 302 is controlled by the access mode information as established by the current settings of the limited active access reservation and limited passive access authorization. The access mode functionality of data storage system 300 further includes a failover manager 308 as an LVM sub-application. As explained in further detail with reference to FIG. 4, failover manager 308 coordinates host node switchover/failover utilizing the presently described active and passive access settings to facilitate a simpler, faster failover cycle.

Figure 4:
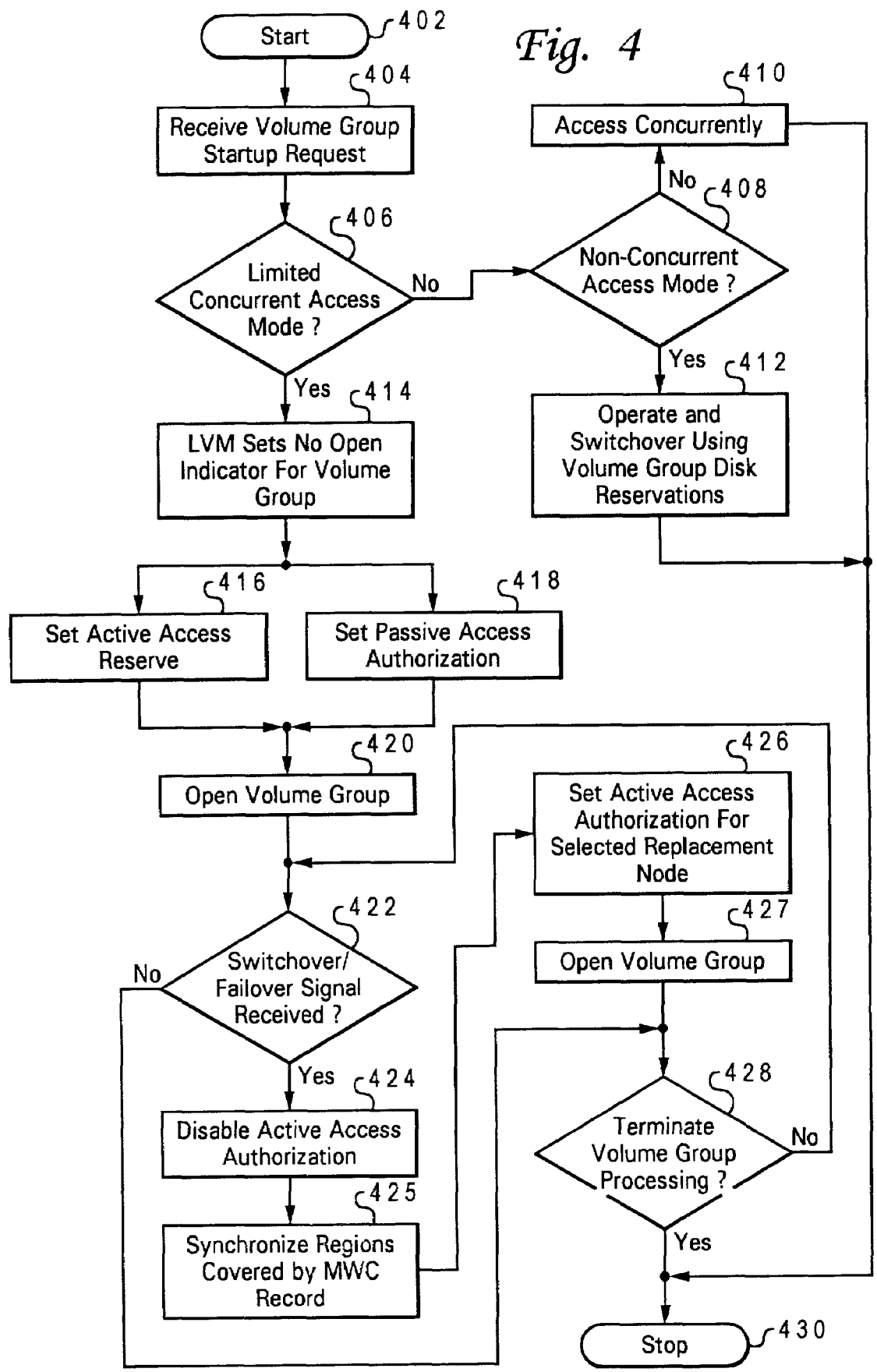
FIG. 4 is a flow diagram depicting initialization and processing of a shared resource volume group in accordance with a preferred embodiment of the present invention.

Referring to FIG. 4, there is illustrated a flow diagram depicting initialization and processing of a shared resource volume group, such as that depicted in FIG. 3, in accordance with a preferred embodiment of the present invention. The process commences as shown at step 402, and proceeds to step 404 with receipt by LVM 304 of a request to startup volume group 302. In one embodiment of the present invention, the startup request depicted at step 404 may be triggered in response to a power-on sequence of primary host server node 312. Next, as illustrated at steps 406 and 408, a high-availability cluster multiprocessing application (HACMP) 317 determines which access mode, among concurrent mode, non-concurrent mode, or limited concurrent, will be implemented to provide control access from server nodes 312 and 314 to data storage resources within volume group 302.

The particular manner or means by which a given volume group access mode is selected is not an important feature of the present invention, and is therefore not explained in great detail herein. However, such access mode selection may be predesignated by a system administrator as a selectable option of HACMP 333 that may be automatically or manually set during volume group initialization. If, as depicted at steps 408 and 412, conventional non-concurrent access mode has been determined as applicable for volume group 302, a conventional disk reservation mechanism, such as SCSI disk reserves, is deployed accordingly, and only one of server nodes 312 or 314 will have access to file system resources for volume group 302 in accordance with conventional non-concurrent volume group techniques. If conventional concurrent access mode has been selected, the data resources and volume management for volume group 302 are shared concurrently by host servers 312 and 314 (step 410).

If, however, limited concurrent access mode is selected as the applicable access mode during the startup procedure for volume group 302, LVM 304 responds by issuing a "no open" instruction to LVDD 310, as depicted at step 414. The no open instruction directs LVDD 310 to block all except read-only access from each of the applicable host server nodes 312 and 314 to volume group 302. In further response to determining that limited concurrent access is the applicable volume group access mode, LVM 304, under the direction of an application layer mechanism, such as high-availability cluster multiprocessing application(HACMP) 333, designates and internally registers each of server nodes 312 and 314 as having either a limited active reservation or a limited passive access authorization to file system resources within volume group 302. As an example, it will be assumed that server node 312 has been designated as the initially active node and server node 314 has been designated as the standby node.

After registering server node 312 as the active host and server node 314 as the passive standby device, HACMP 333 instructs LVDD 310 to set active access authorization field 332 and limited passive access authorization field 334 accordingly as illustrated at steps 416 and 418. LVDD 310 processes subsequent volume group access requests (read and write requests) in accordance with the settings of active access authorization field 332 and limited passive access authorization field 334. Specifically, assuming that the contents of active access authorization field 332 identify server node 312 as have active access authorization, LVDD 310 accepts and processes all user and meta data access requests (read and write requests) from server node 312. Further assuming that server node 314 is identified by the contents of passive access authorization field 334 as having passive access authorization, LVDD 310 blocks all access requests from server node 314 except read requests for data within logical volume meta data 317.

The limited active access reservation and limited passive access settings illustrated at steps 416 and 418 serve as corresponding active or passive access authorizations for server nodes 312 and 314 as soon as each is brought on-line and begins issuing volume group access requests to host bus adapter 330. The method by which volume group access requests are processed in accordance with the active and passive access designations to effectuate the limited concurrent access of the present invention are explained in further detail with reference to FIG. 5.

After server nodes 312 and 314 have opened and accessed data storage resources within volume group 302 consistent with enforcement of their respective access designations by LVDD 310 (step 420), normal runtime processing continues in accordance with the current access designations until a host node switchover signal is received by failover manager application 308 within LVM 304. As utilized herein, a "switchover signal" is any signal or electronic message indicative of a condition with the data storage system that the host server node current designated as having active access will be or has been taken offline and replaced with an alternate host node. Such a switchover signal may be received by failover manager 308 from HACMP 333 in response to HACMP 333 either detecting a system failure (failure of the current active node, for example), or receiving a system administrator request to switch control access from the current host node.

As illustrated at steps 422, 424, and 426, in response to receipt of a switchover signal, failover manager 308 coordinates a fast failover cycle in accordance with the present invention. First, in response to LVM 304 receiving a switchover/failover signal indicating the volume group has been or will imminently be closed (step 422), failover manager 308 instructs LVDD 310 to disables the currently enabled limited active access reservation and limited passive active authorization as depicted at step 424.

In one embodiment of the present invention, the eligibility of server node 314 as an eligible next-in-line active access host is established by requiring that failover manager 308 determine that server node 314 was passive access authorized at the time the switchover signal was received. Although not expressly depicted in FIG. 4, the active or passive access status of each of server nodes 312 and 314 is registered with and accessible from HACMP 333.

The fast failover cycle continues as illustrated at step 425, with LVDD 310 reading a mirror write consistency (MWC) record 321 within physical volume 306*b* and, in response thereto, synchronizing those disk regions effected by the contents of the record. MWC is well known in the art as a processing application which logs in-flight write operations so that mirrors can be made consistent after a disk or system crash. In addition, although not explicitly depicted in FIG. 4, a replacement active host node is selected. Assuming that at the time the switchover/failover signal was received, server node,312 was designated within LVDD 310 as having a limited active access reservation, server node 314 may now be selected to become the replacement active host server by one of two possible processes. For the first active node selection process undertaken during a fast failover cycle, failover manager 308 or another sub-application within LVM 304 determines whether server node 314 was designated as having passive access (i.e. logical volume meta data read-only access). This determination may be made by default, wherein the passive access authorization is merely a flag indicating that limited concurrent volume group access is or is not the current volume group access mode as determined at steps 406 and 408. If limited passive access authorization field 334 is merely a flag indicating that limited concurrent access is the current volume group access mode, and does not affirmatively confer limited passive access to one or more specified nodes, then server node 314 is identified as having had passive authorization by default. If, however, passive access authorization field 334 is utilized in conjunction with the active access authorization established in field 332 to affirmatively confer limited passive access to one or more server nodes, the determination of whether server node 314 was passive authorized may be made by reading the corresponding access status registration in HACMP 333.

Although only implicitly illustrated in FIG. 4, it should be noted that a determination of current passive access authorization may serve as part of the eligibility determination of a given node to become the next active access node. In a preferred embodiment of the present invention, the determination of whether server node 314 had passive-authorized access at the time the switchover signal was received at step 422 is utilized as a criterion for selecting a replacement host. Specifically, the fact or extent of the eligibility of server node 314 to be selected as the next active host is affirmed or increased if it is determined that server node 314 was passive authorized at the time the switchover signal was received. Utilizing passive access authorization is beneficial in ensuring that the selected active access node has received file system meta data updates and is thus ready to activate the volume group without having to read file system meta data.

Following the update to disk regions covered by MWC 321, the selected replacement host node, in this case server node 314, is designated within limited active access reservation field 332 as having limited active access reservation (step 426), as specified herein, to file system resources within volume group 302.

Although not explicitly depicted in FIG. 4, the active node replacement illustrated at step 426 may include a corresponding passive node replacement in which one or more alternate nodes are designated within limited passive access authorization field 334 as having limited passive access authorization as specified herein. Following the synchronization of regions covered by MWC 321 and setting of the limited active reservation and passive authorization(s), volume group is reopened as depicted at step 427 and limited concurrent processing with fast failover capability continues until a determination is made to terminate volume group processing (step 428) at which point the process ends as illustrated at step 430.

Figure 5:
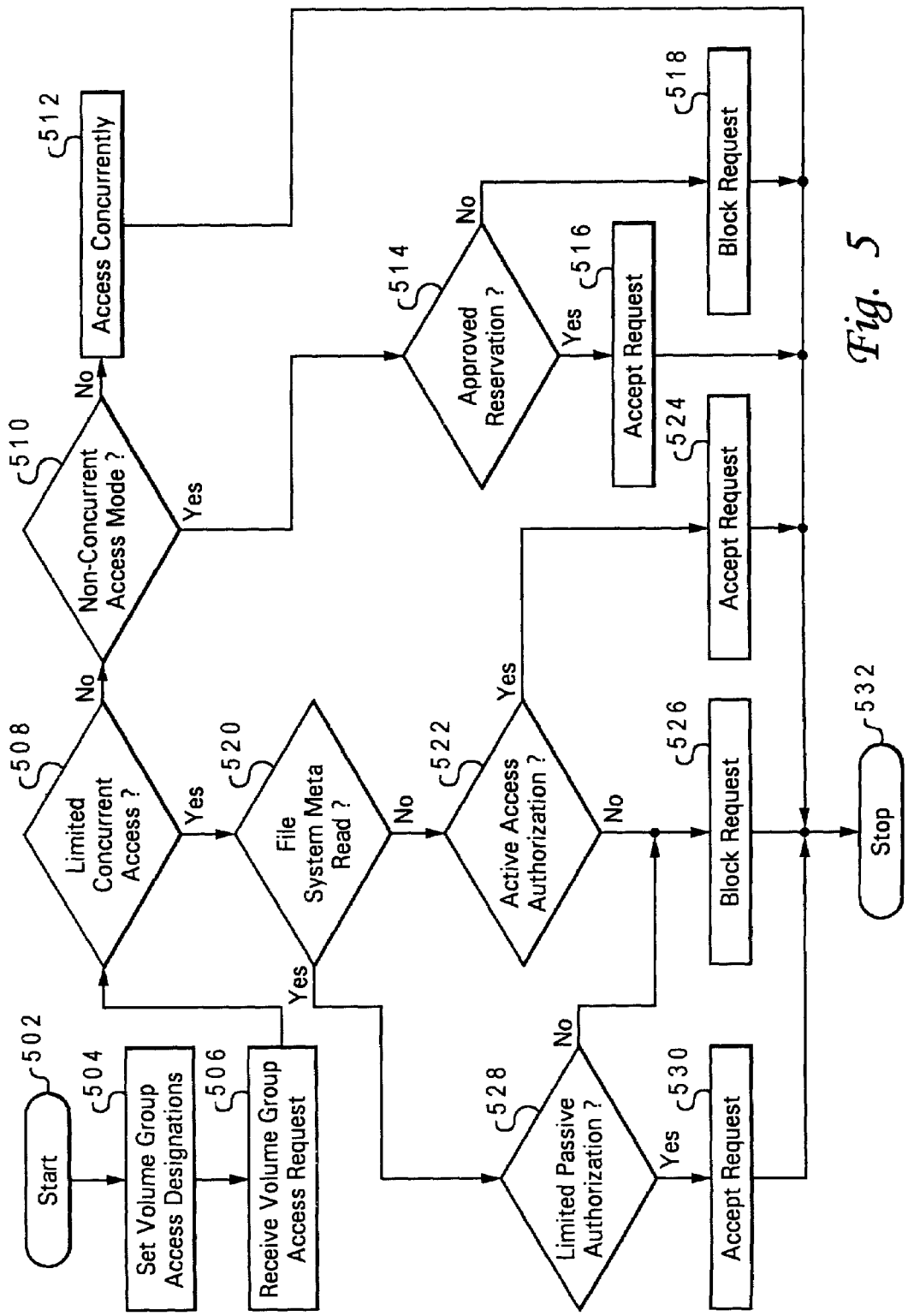
FIG. 5 is a flow diagram illustrating process steps performed by a logical volume managed system during processing of a volume group access request in accordance with a preferred embodiment of the present invention.

With reference to FIG. 5, there is depicted a flow diagram illustrating process steps performed by a logical volume managed system, such as data storage system 300, during processing of a volume group access request in accordance with the settings of limited active access reservation field 332 and limited passive access authorization field 334. The process begins as shown at step 502, and proceeds with HACMP 333 selecting a volume group access mode from among concurrent, non-concurrent, and limited concurrent access (step 504). Next, in response to receiving a volume group access request (read or write, for example) from one of server nodes 312 and 314 (step 506), LVM 304 determines which access mode (concurrent, limited concurrent, or non-concurrent) is applicable in accordance with the selected volume group access mode (steps 508 and 510). If concurrent access is the applicable volume group access mode, the node request is generally accepted subject to concurrent access protocol as depicted at step 512.

If as illustrated at steps 510, non-concurrent access is the applicable volume group access mode, LVDD 310 determines whether the requesting node is the reserved host node as indicated by non-concurrent host reservations field(s) (not depicted) in host bus adapter 330 (step 514). If the requestor is approved in accordance with the non-concurrent reservation, the node request is accepted by LVDD 310 as depicted at step 516. If the reservation excludes the requester, the request is blocked as illustrated at step 518.

If it is determined at step 508 that limited concurrent access is the applicable access mode for volume group 302, the processing of the node request proceeds as follows. As depicted at step 520, LVDD 310 determines whether or not the request is a read to file system LVM meta data within the volume group. In response to determining that the node request is a read request directed to meta data 317, the request is accepted and processed as illustrated at step 540. If the node request is other than a read of meta data 317, LVDD 310 determines whether the requesting node is designated as having active access to volume group 302 as depicted at step 522. If the requesting node is designated as having active access, as defined herein with reference to FIGS. 3 and 4, the request is accepted and processed as depicted at step 524. If the requesting node is not designated as having active access, the request is blocked as illustrated at step 526 and the process terminates at step 530.

Figure 6A:
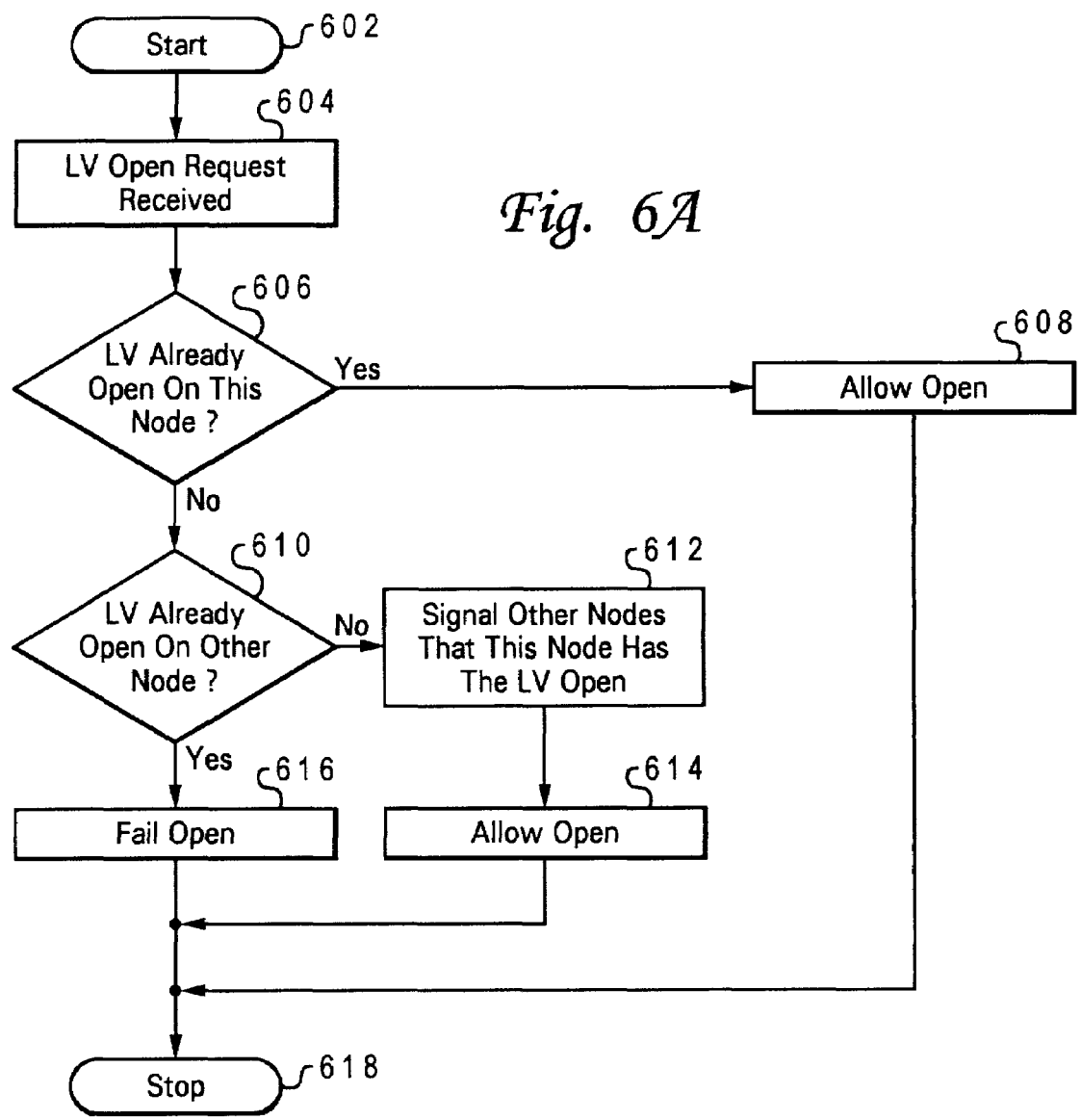
FIG. 6A is a flow diagram depicting a process for serializing open processing for a concurrent volume group.

FIG. 6A is a flow diagram depicting a process for serializing open processing for a concurrent volume group in accordance with one embodiment of the present invention. The process begins as depicted at step 602 and proceeds to step 604 with a logical volume open request being received by LVDD 310. Next, as illustrated at step 606 a determination is made of whether or not the object logical volume is already open on the requester. If so, and as depicted at step 608 LVDD 310 permits the open. If the logical volume is not already open on the requesting node, a further determination is made of whether or not the logical volume is already open on another node (step 610).

Responsive to determining that the logical volume is already open on another node, the open request is rejected by LVDD 310 as shown at step 616. If, however, the logical volume is neither open on the requestor nor on another node, the open request is allowed and a message is delivered to the other nodes indicating that the object logical volume is open and the identity of the requestor as depicted at steps 612 and 614. The open processing terminates as shown at step 618.

Figure 6B:
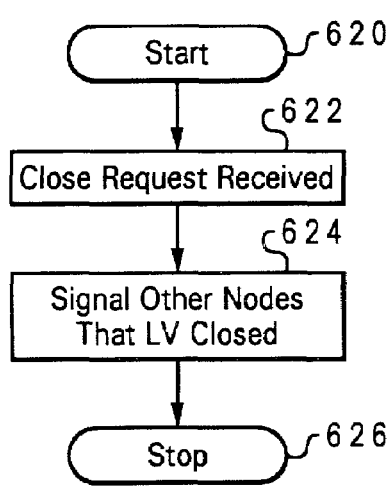
FIG. 6B is a flow diagram illustrating a processing for closing a logical volume in a serial access concurrent volume group.

FIG. 6B is a flow diagram illustrating a processing for closing a logical volume in a serial access concurrent volume group. The process begins as shown at step 620 and proceeds to step 622 with a close processing request received by LVDD 310. Responsive to the close request being received, LVDD signals the other nodes (i.e. nodes on which the logical volume was not previously open) that the logical volume has been closed as depicted at step 624. The process terminates as illustrated at step 626.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of computer processing systems within one or more networked nodes. Until required by the computer system, the set of instructions maybe stored as a computer-program product in another computer memory, for example, in a disk drive (which may include a removable memory such as an optical disk or floppy disk for eventual utilization in disk drive).

A method and system have been disclosed for establishing and controlling host node access to shared volume group resources. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling multi-node access to a disk storage system, wherein the disk storage system is a volume group containing a plurality of disk drives, the volume group accessible by a cluster multiprocessing application that provides application layer access from a first and a second node to the volume group, said method comprising:
   responsive to a volume group startup instruction received by the cluster multiprocessing application, initializing the volume group, wherein said initializing the volume group includes blocking write access from each of the first and second nodes to the disk drives within the volume group; and
   following said initializing:
   setting an active access authorization for a first node, wherein the active access authorization enables read and write access by the first node to user and meta data within the disk storage system; and
   setting a passive access authorization for a second node, wherein the passive access authorization enables read-only access by the second node to meta data within the disk storage system and prevents access by the second node to file system user data within the disk storage system.

2. The method of claim 1, wherein said steps of setting an active access authorization and setting a passive access authorization further comprise setting the active access authorization and the passive access authorization within a logical volume manager that interfaces the first and second nodes with disk drives within the disk storage system.

3. The method of claim 1, wherein the meta data includes file and directory information characterizing the structure of a file system within the disk storage system.

4. The method of claim 3, wherein the meta data is stored in a logical volume within the disk storage system, and wherein the passive access authorization enables read-only access by the second node to the logical volume containing the meta data.

5. The method of claim 4, wherein the meta data within the logical volume includes information describing file and directory mount points.

6. The method of claim 4, wherein the meta data further includes information about mirrored copies of mirror protected data within the data storage device.

7. The method of claim 1, further comprising:
   subsequent to initializing the volume group and setting the active and passive access authorizations, opening the volume group from the first and second node.

8. The method of claim 7, wherein said opening the volume group comprises:
   accessing file system information within the volume group in accordance with the active and passive access authorizations.

9. The method of claim 1, further comprising:
   responsive to a node switchover request received by the cluster multiprocessing application:
   changing the volume group access authorization setting of the second node from the passive access authorization to the active access authorization; and
   disabling the active access authorization setting of the first node.

10. The method of claim 9, wherein the volume group employs data mirroring, the active access authorization further enabling mirror write consistency (MWC) logging of data written to the disk storage system.

11. The method of claim 10, wherein in further response to a node switchover request received by the cluster multiprocessing application and prior to changing the volume group access authorization setting of the second nod, said method further comprises synchronizing disk regions within the volume group in accordance with a MWC record.

12. The method of claim 10, further comprising:
   determining that the second node is eligible for the active access authorization, wherein the active access authorization eligibility determination includes determining that the second node has a passive access authorization.

13. A system for controlling multi-node access to a disk storage system, wherein the disk storage system is a volume group containing a plurality of disk drives, the volume group accessible by a cluster multiprocessing application that provides application layer access from the first and second nodes to the volume group said system comprising:
   processing means responsive to a volume group startup instruction received by the cluster multiprocessing application, for initializing the volume group, wherein said initializing the volume group includes blocking write access from each of the first and second nodes to the disk drives within the volume group; and
   following said initializing:
   processing means for setting an active access authorization for a first node, wherein the active access authorization enables read and write access by the first node to user and meta data within the disk storage system; and
   processing means for setting a passive access authorization for a second node, wherein the passive access authorization enables read-only access by the second node to meta data within the disk storage system and prevents access by the second node to file system user data within the disk storage system.

14. The system of claim 13, wherein said processing means for setting an active access authorization and setting a passive access authorization further comprises processing means for setting the active access authorization and the passive access authorization within a logical volume manager that interfaces the first and second nodes with disk drives within the disk storage system.

15. The system of claim 13, wherein the meta data includes file and directory information characterizing the structure of a file system within the disk storage system.

16. The system of claim 15, wherein the meta data is stored in a logical volume within the disk storage system, and wherein the passive access authorization enables read-only access by the second node to the logical volume containing the meta data.

17. The system of claim 16, wherein the meta data within the logical volume includes information describing file and directory mount points.

18. The system of claim 16, wherein the meta data further includes information about mirrored copies of mirror protected data within the data storage device.

19. The system of claim 13, further comprising;
processing means for, subsequent to initializing the volume group and setting the active and passive access authorizations, opening the volume group from the first and second node.

20. The system of claim 19, wherein said processing means for opening the volume group comprises:
processing means for accessing file system information within the volume group in accordance with the active and passive access authorizations.

21. The system of claim 13, further comprising;
processing means responsive to a node switchover request received by the cluster multiprocessing application, for:
changing the volume group access authorization setting of the second node from
the passive access authorization to the active access authorization; and
disabling the active access authorization setting of the first node.

22. The system of claim 21, wherein the volume group employs data mirroring, the active access authorization further enabling mirror write consistency (MWC) logging of data written to the disk storage system.

23. The system of claim 22, further comprising processing means responsive to a node switchover request received by the cluster multiprocessing application and prior to changing the volume group access authorization setting of the second node, for synchronizing disk regions within the volume group in accordance with a MWC record.

24. The system of claim 21, further comprising:
processing means for determining that the second node is eligible for the active access authorization, wherein the active access authorization eligibility determination includes determining that the second node has a passive access authorization.

25. A computer-readable medium having encoding thereon computer-executable instructions for controlling multi-node access to a disk storage system, wherein the disk storage system is a volume group containing a plurality of disk drives, the volume group accessible by a cluster multiprocessing application that provides application layer access from the first and second nodes to the volume group, said computer-executable instructions performing a method comprising:
responsive to a volume group startup instruction received by the cluster multiprocessing application, initializing the volume group, wherein said initializing the volume group includes blocking write access from each of the first and second nodes to the disk drives within the volume group; and
following said initializing:
setting an active access authorization for a first node, wherein the active access authorization enables read and write access by the first node to user and meta data within the disk storage system; and
setting a passive access authorization for a second node, wherein the passive access authorization enables read-only access by the second node to meta data within the disk storage system and prevents access by the second node to file system user data within the disk storage system.

26. The computer-readable medium of claim 25, wherein said setting an active access authorization and setting a passive access authorization further comprises setting the active access authorization and the passive access authorization within a logical volume manager that interfaces the first and second nodes with disk drives within the disk storage system.

27. The computer-readable medium of claim 25, wherein the meta data includes file and directory information characterizing the structure of a file system within the disk storage system.

28. The computer-readable medium of claim 27, wherein the meta data is stored in a logical volume within the disk storage system, and wherein the passive access authorization enables read-only access by the second node to the logical volume containing the meta data.

29. The computer-readable medium of claim 28, wherein the meta data within the logical volume includes information describing file and directory mount points.

30. The computer-readable medium of claim 28, wherein the meta data further includes information about mirrored copies of mirror protected data within the data storage device.

31. The computer-readable medium of claim 25, said method further comprising:
subsequent to initializing the volume group and setting the active and passive access authorizations, opening the volume group from the first and second node.

32. The computer-readable medium of claim 31, wherein said opening the volume group comprises:
accessing file system information within the volume group in accordance with the active and passive access authorizations.

33. The computer-readable medium of claim 25, said method further comprising:
responsive to a node switchover request received by the cluster multiprocessing application:
changing the volume group access authorization setting of the second node from the passive access authorization to the active access authorization; and
disabling the active access authorization setting of the first node.

34. The computer-readable medium of claim 33, wherein the volume group employs data mirrorring, the active access authorization further enabling mirror write consistency (MWC) logging of data written to the disk storage system.

35. The computer-readable medium of claim 34, said method further comprising responsive to a node switchover request received by the cluster multiprocessing application and prior to changing the volume group access authorization setting of the second node, synchronizing disk regions within the volume group in accordance with a MWC record.

36. The computer-readable medium of claim 33, said method further comprising:
determining that the second node is eligible for the active access authorization, wherein the active access authorization eligibility determination includes determining that the second node has a passive access authorization.

* * * * *